United States Patent [19]
Ludewig et al.

[11] Patent Number: 5,521,354
[45] Date of Patent: May 28, 1996

[54] METHOD FOR ARC WELDING FAULT DETECTION

[75] Inventors: Howard W. Ludewig, Groveland; James H. Siwicke; Alan L. Kilty, both of Peoria; Brian L. Wallace, Peoria Heights; Stephen A. Haytcher, Crest Hill; Dean E. Rees, Creve Coeur, all of Ill.

[73] Assignee: Caterpillar Inc., Peoria, Ill.

[21] Appl. No.: 263,328

[22] Filed: Jun. 21, 1994

[51] Int. Cl.$^6$ ................................................. B23K 9/095
[52] U.S. Cl. ........................... 219/130.01; 219/130.21
[58] Field of Search .................. 219/130.01, 130.21, 219/130.31, 130.32, 130.33

[56] References Cited

U.S. PATENT DOCUMENTS

| | | | |
|---|---|---|---|
| 3,632,960 | 1/1972 | Erdmann-Jesnitzer et al. | 219/130.01 |
| 3,673,377 | 6/1972 | Erdmann-Jesnitzer et al. | 219/130.01 |
| 3,792,225 | 2/1974 | Needham et al. | 219/130.21 |
| 4,605,836 | 8/1986 | Retfalvi et al. | 219/130.01 |
| 5,221,825 | 6/1993 | Siewert et al. | 219/130.01 |
| 5,349,156 | 9/1994 | Madigan et al. | 219/130.01 |

OTHER PUBLICATIONS

Adam et al, "Sensing of GMAW Droplet Transfer Modes Using an ER100S–1 Electrode", Welding Research Supplement, Mar. 1990, pp. 103s–108s.

Primary Examiner—Clifford C. Shaw
Attorney, Agent, or Firm—Dennis C. Skarvan

[57] ABSTRACT

A method for sensing and controlling the weld quality of gas metal arc welding employs sampling of the welding current and voltage signals and making determinations of the weld quality state based on information embedded in those signals. The signals are processed such that the quality of the weld can be determined and the appropriate steps are taken to respond to the detected quality level. If the quality level is deemed unacceptable the process is terminated and the operator is alerted. The method includes determinations based on the standard deviation of the electrical signal, the summed power spectrum of the electrical signal, and/or the average absolute value of the time derivative of the electrical signal.

22 Claims, 4 Drawing Sheets

5,521,354

METHOD FOR ARC WELDING FAULT DETECTION

TECHNICAL FIELD

The present invention relates generally to fault detection strategies for determining the quality of an arc welding process in real time.

BACKGROUND ART

Gas Metal Arc Welding (GMAW) is an arc welding process in which an electrical arc is established between a continuously fed consumable electrode and the base metal to be welded. In GMAW, energy from the arc is used to melt the base metal and the electrode. Droplets form on the tip of the molten electrode and are transferred across the arc. An inert or slightly reactive shielding gas is provided in the arc region to reduce the reaction of the base metal, molten electrode, and arc due to contamination by the atmosphere. A constant potential power source is used to hold the arc voltage constant for a given electrode feed rate via an internal feedback control. Disturbances in the arc region such as shielding gas contamination, weld pool interference, and excessive melt-through can be detected in the current and voltage signals as the power source compensates for these events.

Prior arc welding strategies have sensed variations in the current signal or voltage signal in order to track the weld seam, adjust the fill volume, or detect shielding gas contamination in pulse welding. For example, see U.S. Pat. No. 5,221,825 issued on Jun. 22, 1993 to Siewert et al. in which electrical signals are sampled to determine shielding gas quality, the occurrence of short circuits and frequency thereof, pulse frequency and standard deviation thereof, contact tube wear and trends in the sampled electrical signals.

Still, there is always a need for improved arc welding fault detection strategies. Preferably, such strategies should resolve the quality state of the weld based on the characteristics of the welding current and voltage signals. Also, such strategies should resolve one or more quality states of the weld using real time processing so that the weld operator can be immediately alerted to a poor weld and/or the weld process can be immediately terminated. Further, such strategies should be capable of being practically implemented at a speed sufficient to avoid producing defective welds due to the formation of porosity, excessive convexity, and/or excessive melt-through.

DISCLOSURE OF THE INVENTION

According to one embodiment of the present invention, a method for determining in real time the quality of a weld during a weld process is disclosed, the weld process including a power source, a weld electrode and a base plate defining an electrical circuit, the method comprising the steps of:

sampling an electrical signal from the electrical circuit;

determining the standard deviation of the electrical signal for a predetermined time period;

comparing the standard deviation of the electrical signal to a first predetermined limit and terminating the weld process if the standard deviation of the electrical signal exceeds the first predetermined limit; and comparing the standard deviation of the electrical signal to a second predetermined limit less than the first predetermined limit and continuing the weld process if the second predetermined limit exceeds the standard deviation of the electrical signal.

According to another embodiment of the present invention, a method for determining in real time the quality of a weld during a weld process is disclosed, the weld process including a power source, a weld electrode and a base plate defining an electrical circuit, the method comprising the steps of:

sampling an electrical signal from the electrical circuit;

determining the standard deviation of the electrical signal for a predetermined time period;

comparing the standard deviation of the electrical signal to a first predetermined limit;

determining the power spectrum of the electrical signal for a predetermined range;

summing the power spectrum of the electrical signal over the predetermined range; and comparing the summed power spectrum of the electrical signal to a second predetermined limit.

According to yet another embodiment of the present invention, a method for determining in real time the quality of a weld during a weld process is disclosed, the weld process including a power source, a weld electrode and a base plate defining an electrical circuit, the method comprising the steps of:

sampling an electrical signal from the electrical circuit;

determining the time derivative of the electrical signal;

determining the absolute value of the time derivative of the electrical signal;

averaging the absolute value of the time derivative of the electrical signal over a first predetermined time period; and comparing the average absolute value of the time derivative of the electrical signal to a first predetermined limit.

BEST MODE FOR CARRYING OUT THE INVENTION

Figure 1:
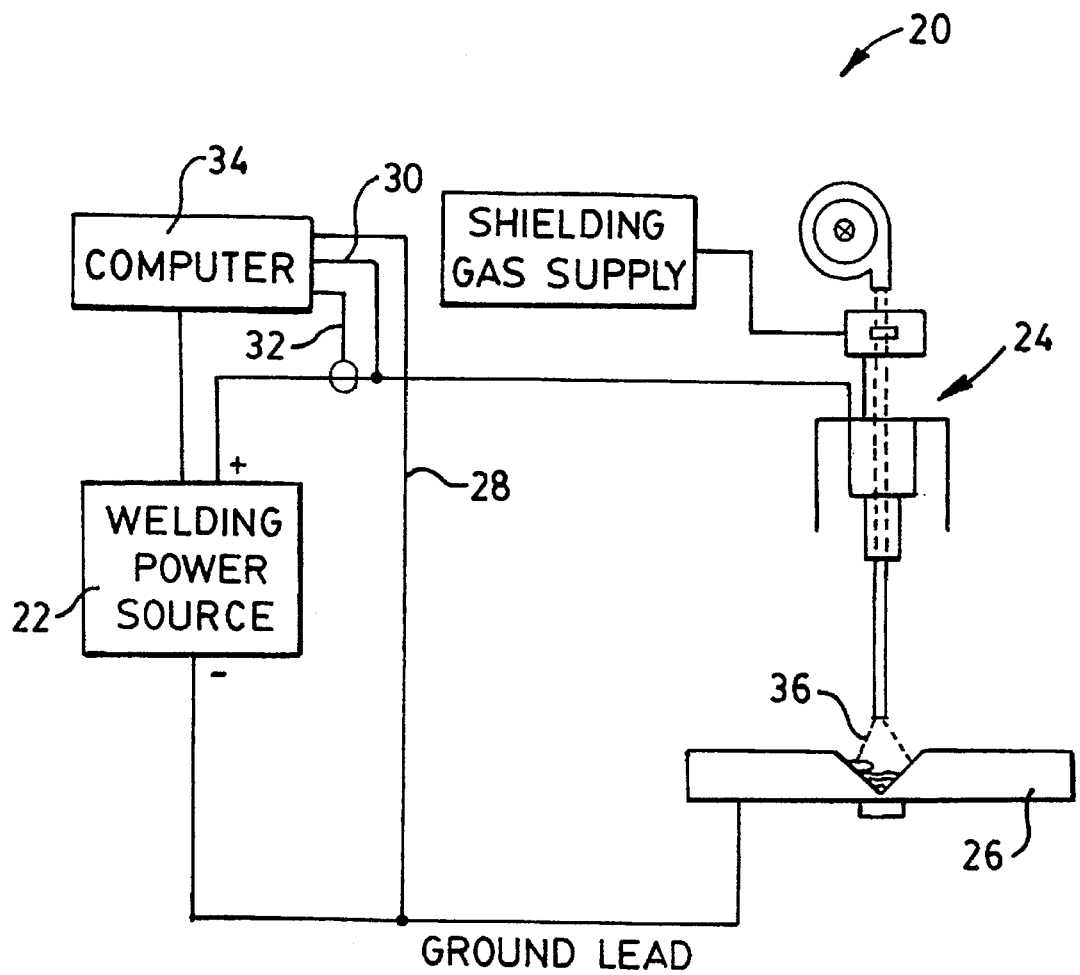
FIG. 1 is a data acquisition circuit in which voltage and current are sensed for a weld process according to one embodiment of the present invention.

Referring now to FIG. 1, a conventional arc welding circuit 20 is shown including a commercially available welding power source 22, a weld gun 24 and a base plate 26. Conventional voltage and current sensors in the form of leads 28,30 and a torrid core 32, respectively, detect variations in the current and voltage signals across the weld gun 24 as the power source 22 compensates for disturbances in the arc region such as shielding gas contamination, weld pool interference, and excessive melt-through. Other sensors known in the art are also contemplated for us with circuit 20 to detect variations in the current and voltage and include, but are not limited to, Hall-effect transducers and precision current shunts.

In the specific preferred embodiment, a data acquisition computer 34 is used to sample the welding voltage and current signals and to analyze the data according to the particular algorithm employed, discussed hereinafter in greater detail. Computer 34 is equipped with a data acquisition board that has at least two analog inputs and two digital outputs. The signals are digitized by the data acquisition card and put into the computer memory. The quality state of the weld is determined based on processed current and voltage signals.

Computer 34 is a conventional personal computer capable of operating at a clock speed of 66 MHz. The sampling rate of circuit 10 is dependent on the speed of computer 34 and, for the specific preferred embodiment, is 2048 Hz in order to receive the full band width of information available from the current and voltage sensors. Because of the speed of the data acquisition computer 34 and the resulting rates at which the information is processed and, also, the algorithms employed to detect the quality state of the weld, circuit 10 is capable of detecting a process fault before the level of defective welds becomes significant. For example, some of the defects that are directly controllable are shielding gas contamination, excessive melt-through, and excessive convexity. When any of these conditions are detected, the operator is alerted and/or the process is terminated.

The above-described sampling rates permit a decision regarding the quality state of the weld to be made at least one time per second. Although a decision rate of 1 Hz is adequate for the specific preferred embodiment in which heavy sections are welded, the same approach can be applied on thin section weld assemblies by increasing the sampling rate and further reducing the time between control decisions. As a result and regardless of the particular weld section geometry, the present invention appraises the operator of the quality state of the weld and/or terminates the weld based on the real-time weld condition.

In general, disturbances in the arc region 36 cause instabilities in the current and voltage signals that can readily be sensed and detected by the data acquisition system. For example, when the shielding gas is contaminated the surface energies of the molten drop on the end of the electrode can change. These changes cause the drop to grow larger than it normally would under normal shielding atmosphere conditions. The larger drop changes the arc length which, in turn, has an effect on the resistance of the system. This causes instabilities in the current and voltage signals as the drops repeatedly form, grow, and detach in an irregular manner. These instabilities can be detected in the time domain current data under most conditions.

However, under welding conditions that call for relatively high voltages and therefore longer arcs, these instabilities are not readily resolvable in the time domain data. In these cases the signals are better resolved in the frequency domain. Further, testing has shown that most of the instabilities can be measured in the frequencies below 250 Hz.

As a result, the present invention contemplates several techniques for detecting the quality state of the weld. One method is to determine the weld quality as the standard deviation of either the current signal or the voltage signal according to the following steps:

(a) sample the electric signals from the welding process;

(b) calculate a quality parameter over a predetermined time period based on the standard deviation of the above electric signals;

(c) compare the quality parameter to a predetermined lower threshold limit;

(d) map the quality state into an acceptable range if the quality parameter is below the lower threshold limit;

(e) compare the quality parameter to a predetermined upper threshold limit;

(f) map the quality state into a potentially poor range if the quality parameter is above the lower threshold limit but below the upper threshold limit;

(g) alert the operator;

(h) map the quality state into a poor range if the quality parameter is above the upper threshold limit; and (i) alert the operator and terminate the welding process.

As such, this method permits classification of the welding quality into three states. Further, this method responds very quickly to perturbations in the welding process. If the weld quality state is such that a poor weld may be produced, the operator is alerted; however, the weld is permitted to proceed. If the quality state is deemed poor, the weld is terminated before an excessive amount of poor quality weld is produced.

Figure 2:
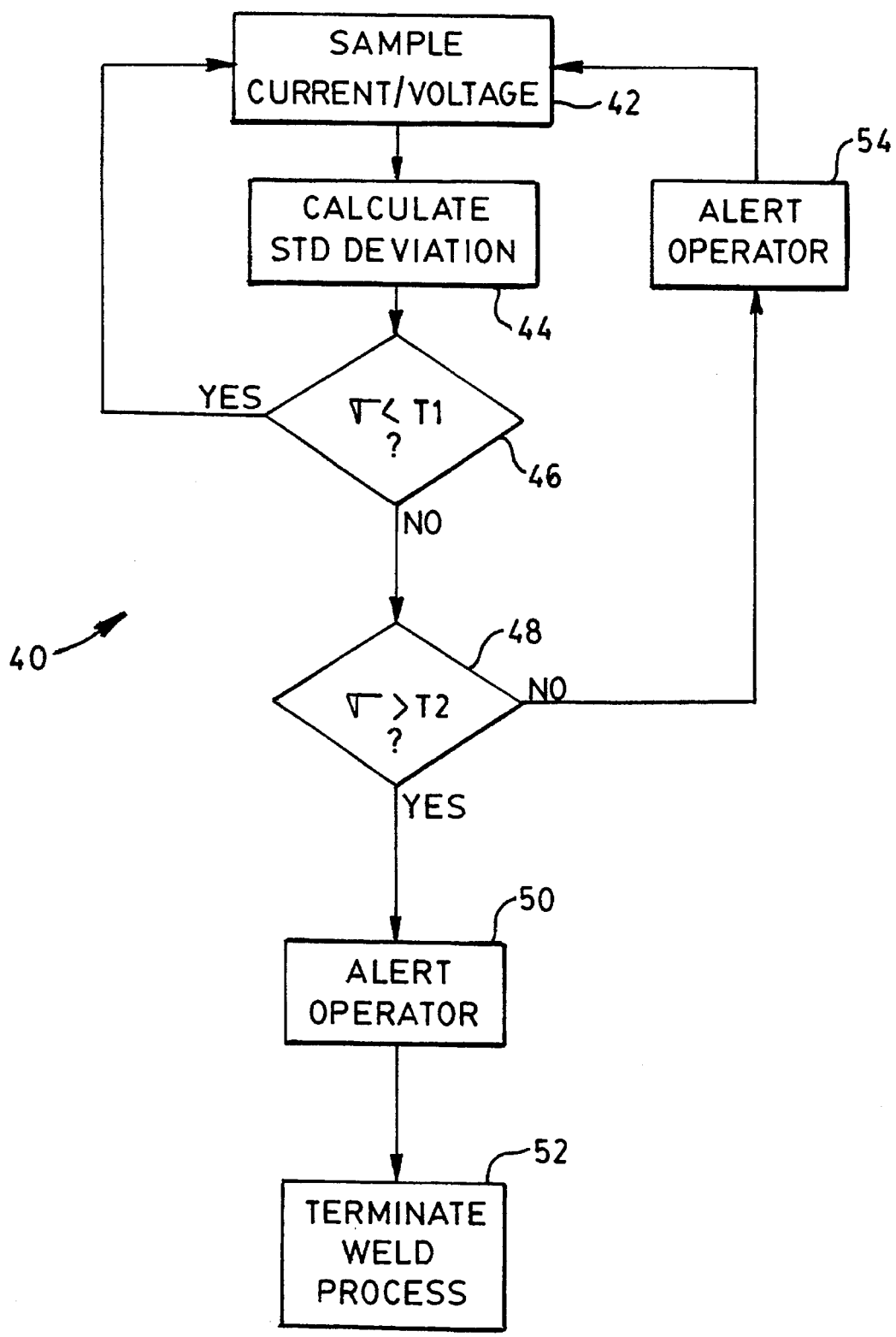
FIG. 2 is a flow chart describing a first algorithm in which the standard deviation of the sensed voltage and/or current is used for determining weld quality of the weld process of FIG. 1.

Referring now to FIG. 2, a subroutine 40 is shown for determining weld quality in the time domain. At step 42, computer 34 collects current or voltage data for a predetermined sample period, in the specific preferred embodiment preferably 0.5 seconds. Program execution advances to step 44 to determine the standard deviation of the data collected at step 42 using conventional techniques. At step 46, the standard deviation of the collected data is compared to a predetermined or threshold value 'T1'. If the standard deviation of the collected data is below T1, the weld quality is good and program execution returns to step 42. If the standard deviation of the collected data is greater than or equal to T1, program execution advances to step 48.

At step 48, the standard deviation of the collected data is compared to a predetermined or upper value 'T2'. If the standard deviation of the collected data is greater than T2, the weld quality is defective and program execution advances to step 50, at which point the operator is alerted, and to step 52 to terminate the weld process. If at step 48 the standard deviation of the collected data is less than or equal to T2, the weld quality is possibly poor and program execution advances to step 54, at which point the operator is alerted, and returns to step 42 without terminating the weld process.

As a result, subroutine 40 takes advantage of very simple computations that tend to be very fast when executed on a computer to quickly determine the quality state of the weld so that process control decisions are made at a fast rate, typically greater than one per second. The values of T1 and T2 vary with the type of data acquisition system and welding configuration and the amount of shielding used. It has been found, however, that a value of T1 below the range of about 30 to about 45 is indicative of a good weld for most data acquisition systems and welding configurations. In the specific preferred embodiment shown, T1 is approximately 30. A value of T2 above the range of about 40 to about 50, conversely, is indicative of a defective weld for most data acquisition systems. In the specific preferred embodiment shown, T2 is approximately 45.

Another method is to determine the weld quality both in the time domain (standard deviation) and frequency domain (fast fourier transform). This method quantifies those welds that were identified as being possibly poor according to the following steps:

(a) sample the electric signals from the welding process;

(b) calculate a quality parameter over a predetermined time period based on the standard deviation of the above electric signals;

(c) compare the quality parameter to a predetermined lower threshold limit;

(d) map the quality state into an acceptable range if the quality parameter is below the lower threshold limit;

(e) compare the quality parameter to a predetermined upper threshold limit;

(f) map the quality state into a poor range if is the quality parameter is above the predetermined upper threshold limit;

(g) alert the operator and terminate the welding process if the quality state of the weld is mapped into a poor range;

(h) map the quality state into a potentially poor range if the quality parameter is above the lower threshold limit but below the upper threshold limit;

(i) calculate the power spectrum of the signals collected in (a) over a predetermined range;

(j) calculate a second quality parameter based on the integral of the power spectrum calculated over the predetermined range;

(k) compare the second quality parameter to a second predetermined threshold limit;

(l) map the quality state into a poor range if the second quality parameter is above a second predetermined upper threshold limit; and (m) alert the operator and terminate the welding process if the quality state of the weld is mapped into a poor range.

This method permits classification of the welding quality into two states. Although not necessarily as fast as the first method, this method better resolves perturbations in the welding process. If the quality state is deemed poor, the weld is terminated before an excessive amount of poor quality weld is produced.

Figure 3:
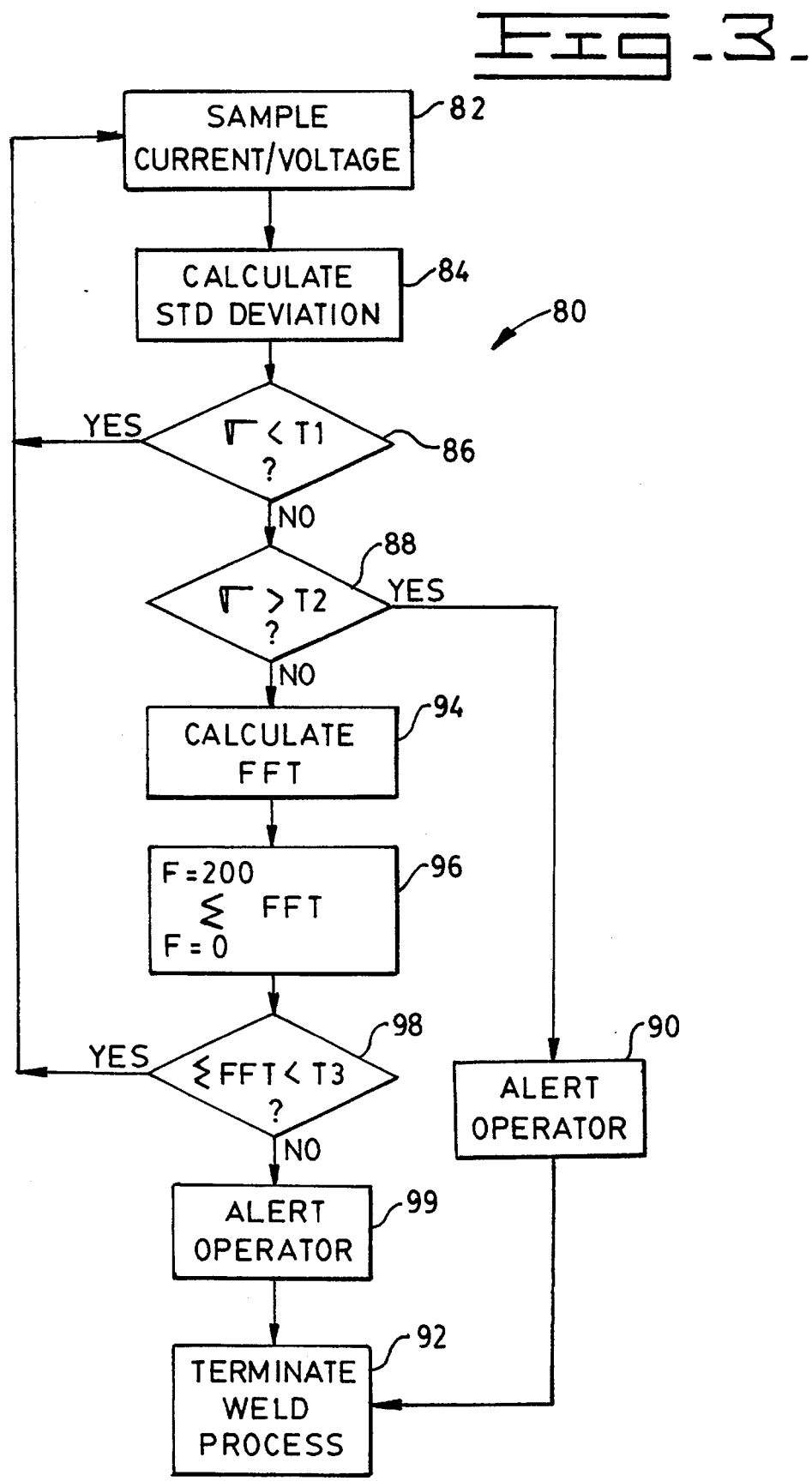
FIG. 3 is a flow chart describing a second alternate algorithm in which the standard deviation as well as the frequency domain of the sensed voltage and/or current is used for determining weld quality of the weld process of FIG. 1.

Referring now to FIG. 3, a subroutine 80 is shown for determining weld quality in both the time domain and frequency domain. Similar to subroutine 40, subroutine 80 first calculates the standard deviation of the collected data. At step 82, computer 34 collects current or voltage data for a predetermined sample period, in the specific preferred embodiment preferably 0.5 seconds. Program execution advances to step 84 to determine the standard deviation of the data collected at step 82 using conventional techniques. At step 86, the standard deviation of the collected data is compared to a predetermined or threshold value 'T1'. If the standard deviation of the collected data is below T1, the weld quality is good and program execution returns to step 82. If the standard deviation of the collected data is greater than or equal to T1, program execution advances to step 88.

At step 88, the standard deviation of the collected data is compared to a predetermined or upper value 'T2'. If the standard deviation of the collected data is greater than T2, the weld quality is defective and program execution advances to step 90, at which point the operator is alerted, and to step 92 to terminate the weld process. If at step 88 the standard deviation of the collected data is less than or equal to T2, the weld quality is possibly poor and program execution advances to step 94. At step 94, the frequency domain of the collected data is calculated using a fast fourier transform. The frequency domain data is then summed from zero to a predetermined frequency at step 96. In the specific preferred embodiment, the predetermined frequency is 200 Hz since most of the data indicative of a defective weld occurs below this frequency.

Program execution advances to step 98 to compare the summation of the frequency domain data to a predetermined or threshold value 'T3'. If the summed frequency domain data is less than T3, the weld quality is good and program execution returns to step 82. If the summed frequency domain data is greater than or equal to T3, the weld quality is defective and program execution advances to step 99 to alert the operator and to step 92 to terminate the weld process.

As a result, subroutine 80 takes advantage of both the time domain and frequency domain techniques to determine weld quality. Although the additional calculations take more processing time, the resulting computations nevertheless permit process control decisions to be made at a rate of one per second. Similar to subroutine 40, the values of T1, T2 and T3 vary with the type of data acquisition system and welding configuration and the amount of shielding used. A value of T1 below the range of about 30 to about 45 is indicative of a good weld for most data acquisition systems and welding configurations. In the specific preferred embodiment shown, T1 is approximately 30. A value of T2 above the range of about 40 to about 50, conversely, is indicative of a defective weld for most data acquisition systems. In the specific preferred embodiment shown, T2 is approximately 45.

The threshold value for T3 is dependent on the sampling rate used to calculate the data. The number of samples in the frequency domain data is established by the time domain sampling rate. For example, a summed frequency domain data less than about 400 to about 800 (400<T3<800) and, particularly, less than about 500 (T3=500) is indicative of a good weld for a data acquisition system in which the sampling rate is 2048 Hz and which results in 1024 samples.

Figure 4:
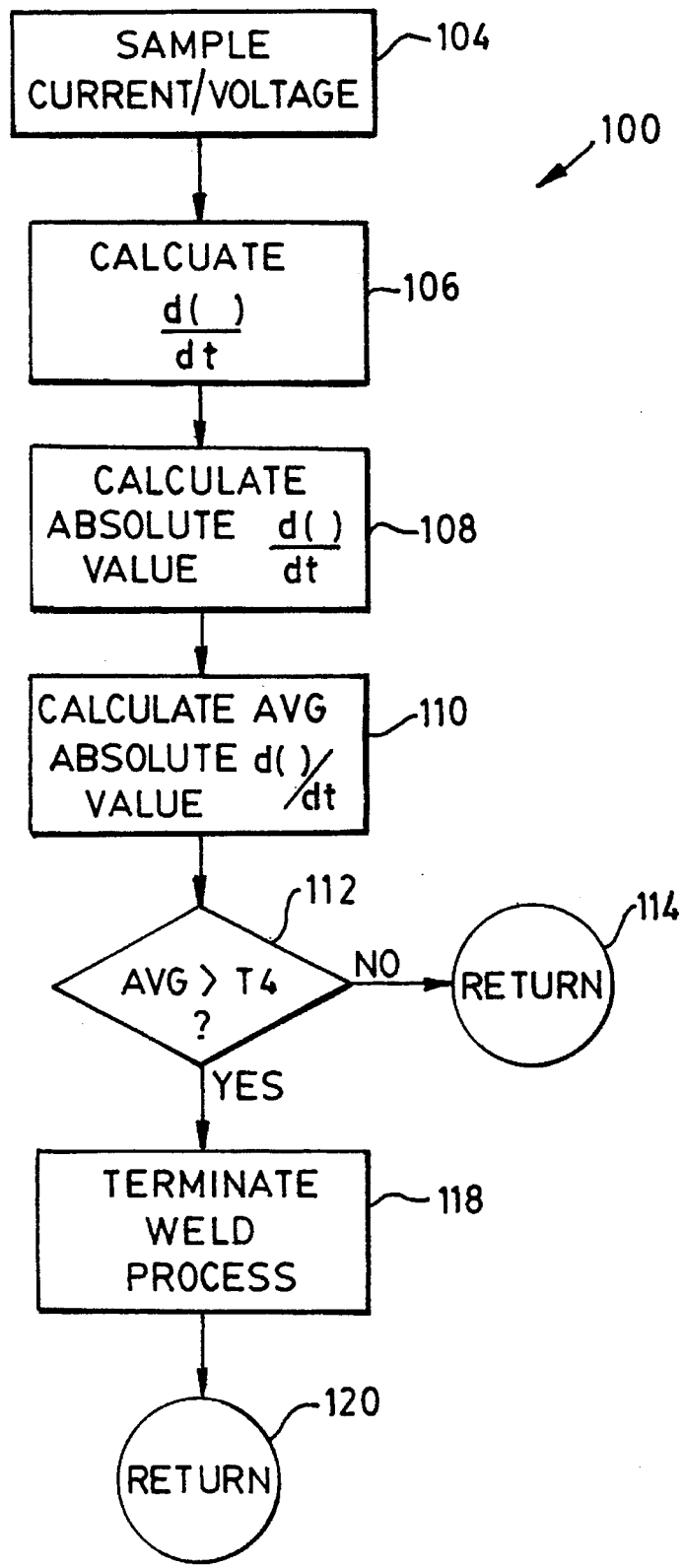
FIG. 4 is a flow chart describing a third alternate algorithm in which the average absolute derivative of the sensed voltage and/or current is used for determining weld quality of the weld process of FIG. 1.

Another method is to determine the weld quality as the average absolute derivative of either the welding signals. Referring now to FIG. 4, a subroutine 100 is shown which in application is usable to determine weld quality either alone, or in combination with subroutine 40. For example in the specific preferred embodiment, rather than advancing to step 54 in subroutine 40, program execution alternately advances to subroutine 100 and, if the weld quality is good, returns from subroutine 100.

In subroutine 100, program execution begins at step 104 to sample and collect data for a predetermined period of time, in the specific preferred embodiment sufficiently short to enable a weld quality decision rate of one per second. Program execution advances to step 106 to determine the derivative or rate of change of the collected data. Program execution advances to step 108 to determine the absolute values of the derivative data, and at step 110, the absolute values of the derivative data are averaged to determine an average absolute derivative value.

At step 112, the average absolute derivative value is compared to a predetermined or limit current value 'T4'. If the average absolute derivative value is less than or equal to T4, the weld quality is good and program execution returns at step 114 to either step 104 or subroutine 40 depending on the application. If the average absolute derivative current value is greater than T4, program execution advances to step 118 to terminate the weld process and to step 120 to return to step 104 or subroutine 40 depending on the application.

In addition to using simple computations that tend to be very fast when executed on a computer, subroutine 100 can be performed with subroutine 40 using analog circuity, thus eliminating the need for a computer. The threshold value for T4 is dependent on the electrical signal sampled. For example, if current is sampled, the threshold value for T4 at a sampling rate of 8 Hz is in the range from about 20 amps/sec to about 50 amps/sec and, particularly, is about 35 amps/sec.

Other features and advantages are contemplated by the present invention in addition to GMAW include the application of the above-described strategies to flux core arc welding and submerged arc welding.

Still other advantages contemplated by the present invention include closed loop control of the various weld processes. For example, as the current and voltage signals are processed, the control algorithm is contemplated to make a determination as to what the defect is and to respond accordingly. If a shielding gas contamination condition is detected, the computer can potentially direct the process to increase the amount of shielding gas flow. If this does not resolve the problem, the operator is alerted and the process is terminated.

If an excessive melt-through condition is detected, the control algorithm is contemplated to direct a robot to increase the electrical electrode extension or increase the travel rate and reduce the wire feed rate. If this does not resolve the problem, the operator is alerted and the process is terminated.

If an excessive convexity condition is detected, the control algorithm is contemplated to direct the welding process to increase the arc voltage. If this does not resolve the problem, the operator is alerted and the process is terminated.

We claim:

1. A method for determining in real time the quality of a weld during a weld process, the weld process including a power source, a weld electrode and a base plate defining an electrical circuit, the method comprising the steps of:

sampling an electrical signal from the electrical circuit;

determining the standard deviation of the electrical signal for a predetermined time period;

comparing the standard deviation of the electrical signal to a first predetermined limit and terminating the weld process if the standard deviation of the electrical signal exceeds the first predetermined limit; and comparing the standard deviation of the electrical signal to a second predetermined limit less than the first predetermined limit and continuing the weld process if the second predetermined limit exceeds the standard deviation of the electrical signal; and producing a warning signal if the standard deviation of the electrical signal is between the first predetermined limit and the second predetermined limit.

2. The method of claim 1, wherein the step of sampling an electrical signal from the electrical circuit, the electrical signal is sampled at approximately 2 KHz.

3. The method of claim 1, wherein in the step of sampling an electrical signal from the electrical circuit, the electrical signal is sampled for a predetermined time period not exceeding 0.5 seconds.

4. The method of claim 1, wherein the weld process is gas metal arc welding.

5. The method of claim 1, wherein the weld process is submerged arc welding.

6. The method of claim 1, wherein the weld process is flux core welding.

7. A method for determining in real time the quality of a weld during a weld process, the weld process including a power source, a weld electrode and a base plate defining an electrical circuit, the method comprising the steps of:

sampling an electrical signal from the electrical circuits;

determining the standard deviation of the electrical signal for a predetermined time period;

comparing the standard deviation of the electrical signal to a first predetermined limit and terminating the weld process if the standard deviation of the electrical signal exceeds the first predetermined limit; and comparing the standard deviation of the electrical signal to a second predetermined limit less than the first predetermined limit and continuing the weld process if the second predetermined limit exceeds the standard deviation of the electrical signal;

determining the power spectrum of the electrical signal for a predetermined range;

summing the power spectrum of the electrical signal over the predetermined range; and comparing the summed power spectrum of the electrical signal to a third predetermined limit and continuing the weld process if the third predetermined limit exceeds the summed power spectrum of the electrical signal and terminating the weld process if the summed power spectrum of the electrical signal exceeds the third predetermined limit.

8. The method of claim 7, wherein the predetermined range is from approximately 0 MHz to approximately 200 Hz.

9. A method for determining in real time the quality of a weld during a weld process, the weld process including a power source, a weld electrode and a base plate defining an electrical circuit, the method comprising the steps of:

sampling an electrical signal from the electrical circuit;

determining the standard deviation of the electrical signal for a predetermined time period;

comparing the standard deviation of the electrical signal to a first predetermined limit and terminating the weld process if the standard deviation of the electrical signal exceeds the first predetermined limit; and comparing the standard deviation of the electrical signal to a second predetermined limit less than the first predetermined limit and continuing the weld process if the second predetermined limit exceeds the standard deviation of the electrical signal;

determining the time derivative of the electrical signal;

determining the absolute value of the time derivative of the electrical signal;

averaging the absolute value of the time derivative of the electrical signal over a predetermined time period; and comparing the average absolute value of the time derivative of the electrical signal to a third predetermined limit and continuing the weld process if the third predetermined limit exceeds the average absolute value of the time derivative of the electrical signal and terminating the weld process if the average absolute value of the time derivative of the electrical signal exceeds the third predetermined limit.

10. A method for determining in real time the quality of a weld during a weld process, the weld process including a power source, a weld electrode and a base plate defining an electrical circuit, the method comprising the steps of:

sampling an electrical signal from the electrical circuit;

determining the standard deviation of the electrical signal for a predetermined time period;

comparing the standard deviation of the electrical signal to a first predetermined limit;

determining the power spectrum of the electrical signal for a predetermined range;

summing the power spectrum of the electrical signal over the predetermined range; and comparing the summed power spectrum of the electrical signal to a second predetermined limit.

11. The method of claim 10, wherein in the step of sampling an electrical signal from the electrical circuit, the electrical signal is sampled at approximately 2 KHz.

12. The method of claim 10, wherein in the step of sampling an electrical signal from the electrical circuit, the electrical signals are sampled for a predetermined time period not exceeding 0.5 seconds.

13. The method of claim 10, wherein the weld process is gas metal arc welding.

14. The method of claim 10, wherein the weld process is submerged arc welding.

15. The method of claim 10, wherein the weld process is flux core welding.

16. A method for determining in real time the quality of a weld during a weld process, the weld process including a power source, a weld electrode and a base plate defining an electrical circuit, the method comprising the steps of:

sampling an electrical signal from the electrical circuit;

determining the time derivative of the electrical signal;

determining the absolute value of the time derivative of the electrical signal;

averaging the absolute value of the time derivative of the electrical signal over a first predetermined time period; and comparing the average absolute value of the time derivative of the electrical signal to a first predetermined limit.

17. The method of claim 16, and further comprising the steps of:

determining the standard deviation of the electrical signal for a second predetermined time period; and comparing the standard deviation of the electrical signal to a second predetermined limit.

18. The method of claim 17, wherein in the step of sampling an electrical signal from the electrical circuit, the electrical signal is sampled at approximately 2 KHz.

19. The method of claim 16, wherein in the step of sampling an electrical signal from the electrical circuit, the electrical signal is sampled for a predetermined time period not exceeding 0.5 seconds.

20. The method of claim 16, wherein the weld process is gas metal arc welding.

21. The method of claim 16, wherein the weld process is submerged arc welding.

22. The method of claim 16, wherein the weld process is flux core welding.

* * * * *